(12) United States Patent
Hathiramani et al.

(10) Patent No.: US 11,696,145 B2
(45) Date of Patent: Jul. 4, 2023

(54) REGISTERED AND UNREGISTERED OPERATION FOR SHARED BAND WIRELESS NODES WITHIN WIRELESS NETWORKS

(71) Applicant: NOKIA SOLUTIONS AND NETWORKS OY, Espoo (FI)

(72) Inventors: Navin Hathiramani, Coppell, TX (US); Milind M. Buddhikot, Bridgewater, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 98 days.

(21) Appl. No.: 17/249,435

(22) Filed: Mar. 2, 2021

(65) Prior Publication Data

US 2021/0282022 A1 Sep. 9, 2021

Related U.S. Application Data

(60) Provisional application No. 62/986,578, filed on Mar. 6, 2020, provisional application No. 62/985,870, filed on Mar. 5, 2020.

(51) Int. Cl.
*H04W 16/14* (2009.01)
*H04W 60/00* (2009.01)
*H04W 72/51* (2023.01)

(52) U.S. Cl.
CPC .......... *H04W 16/14* (2013.01); *H04W 60/00* (2013.01); *H04W 72/51* (2023.01)

(58) Field of Classification Search
CPC .... H04W 16/14; H04W 60/00; H04W 72/048
See application file for complete search history.

(56) References Cited

U.S. PATENT DOCUMENTS

2004/0156328 A1\* 8/2004 Walton ................ H04B 7/0854
370/313
2019/0373610 A1\* 12/2019 Cimpu ................ H04W 72/06
(Continued)

OTHER PUBLICATIONS

"Citizen's Broadband Radio Service (CBRS) White Paper"; Version 1.00; Hospitality Technology Next Generation; Sep. 30, 2018; 35 pages.
(Continued)

*Primary Examiner* — Steven H Nguyen
(74) *Attorney, Agent, or Firm* — Brake Hughes Bellermann LLP

(57) ABSTRACT

According to an example embodiment, a method may include sending, by a wireless node to a spectrum access controller, a request, including information indicating at least a location of the wireless node; receiving, by the wireless node from the spectrum access controller, information indicating at least one restricted channel for the wireless node and indicating at least one unrestricted channel for the wireless node within a shared frequency band; wherein the wireless node is prohibited from transmitting signals via the at least one restricted channel if the wireless node is in an unregistered state with respect to the spectrum access controller; and wherein the wireless node is permitted to transmit signals via the at least one unrestricted channel regardless whether the wireless node is in the registered state or the unregistered state with respect to the spectrum access controller.

21 Claims, 10 Drawing Sheets

(56) References Cited

U.S. PATENT DOCUMENTS

2020/0059794 A1* 2/2020 Singh .................... H04W 72/04
2020/0236557 A1* 7/2020 Richardson ........... H04W 24/04
2021/0099886 A1* 4/2021 Taneja .................. H04L 5/0092

OTHER PUBLICATIONS

Baig et al.; "Interference management for unlicensed users in shared CBRS spectrum"; CoNEXT '18: Proceedings of the 14th International Conference on emerging Networking EXperiments and Technologies; Dec. 2018; pp. 333-345.

* cited by examiner

REGISTERED AND UNREGISTERED OPERATION FOR SHARED BAND WIRELESS NODES WITHIN WIRELESS NETWORKS

CROSS-REFERENCE TO RELATED APPLICATIONS

This application claims priority to U.S. Provisional Patent Application No. 62/985,870, filed Mar. 5, 2020, entitled "REGISTERED AND UNREGISTERED OPERATION FOR SHARED BAND WIRELESS NODES WITHIN WIRELESS NETWORKS," and U.S. Provisional Patent Application No. 62/986,578, filed Mar. 6, 2020, entitled "REGISTERED AND UNREGISTERED OPERATION FOR SHARED BAND WIRELESS NODES WITHIN WIRELESS NETWORKS," both of which are hereby incorporated by reference in their entireties.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node B (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include receiving, by a wireless node from a spectrum access controller for a shared frequency band, information indicating at least one restricted channel for the wireless node within the shared frequency band, wherein the wireless node is permitted to transmit signals via the at least one restricted channel only if the wireless node is in a registered state with respect to the spectrum access controller; transmitting signals, by the wireless node, via the at least one restricted channel, while the wireless node is in a registered state with respect to the spectrum access controller; and transmitting signals, by the wireless node, via the at least one unrestricted channel within the shared frequency band, while the wireless node is in either the registered state or an unregistered state with respect to the spectrum access controller, wherein the at least one unrestricted channel is at least one channel that is not part of the at least one restricted channel.

According to an example embodiment, a method may include sending, by a wireless node to a spectrum access controller, a request, including information indicating at least a location of the wireless node; receiving, by the wireless node from the spectrum access controller, information indicating at least one restricted channel for the wireless node and indicating at least one unrestricted channel for the wireless node within a shared frequency band; wherein the wireless node is prohibited from transmitting signals via the at least one restricted channel if the wireless node is in an unregistered state with respect to the spectrum access controller; and wherein the wireless node is permitted to transmit signals via the at least one unrestricted channel regardless whether the wireless node is in the registered state or the unregistered state with respect to the spectrum access controller.

According to an example embodiment, a method may include receiving, by a spectrum access controller from a wireless node, information indicating at least a location of the wireless node; sending, by the spectrum access controller to the wireless node, information indicating at least one restricted channel for the wireless node within a shared frequency band; wherein the wireless node is prohibited from transmitting signals via the at least one restricted channel if the wireless node is in an unregistered state with respect to the spectrum access controller; and wherein the wireless node is permitted to transmit signals via the at least one unrestricted channel regardless whether the wireless node is in a registered state or the unregistered state with respect to the spectrum access controller.

Other example embodiments are provided or described for various described example methods, including: means for performing any of the example methods; a non-transitory computer-readable storage medium comprising instructions stored thereon that, when executed by at least one processor, are configured to cause a computing system to perform any of the example methods; and an apparatus including at least one processor, and at least one memory including computer program code, the at least one memory and the computer program code configured to, with the at least one processor, cause the apparatus at least to perform any of the example methods.

The details of one or more examples of embodiments are set forth in the accompanying drawings and the description below. Other features will be apparent from the description and drawings, and from the claims.

DETAILED DESCRIPTION

Figure 1:
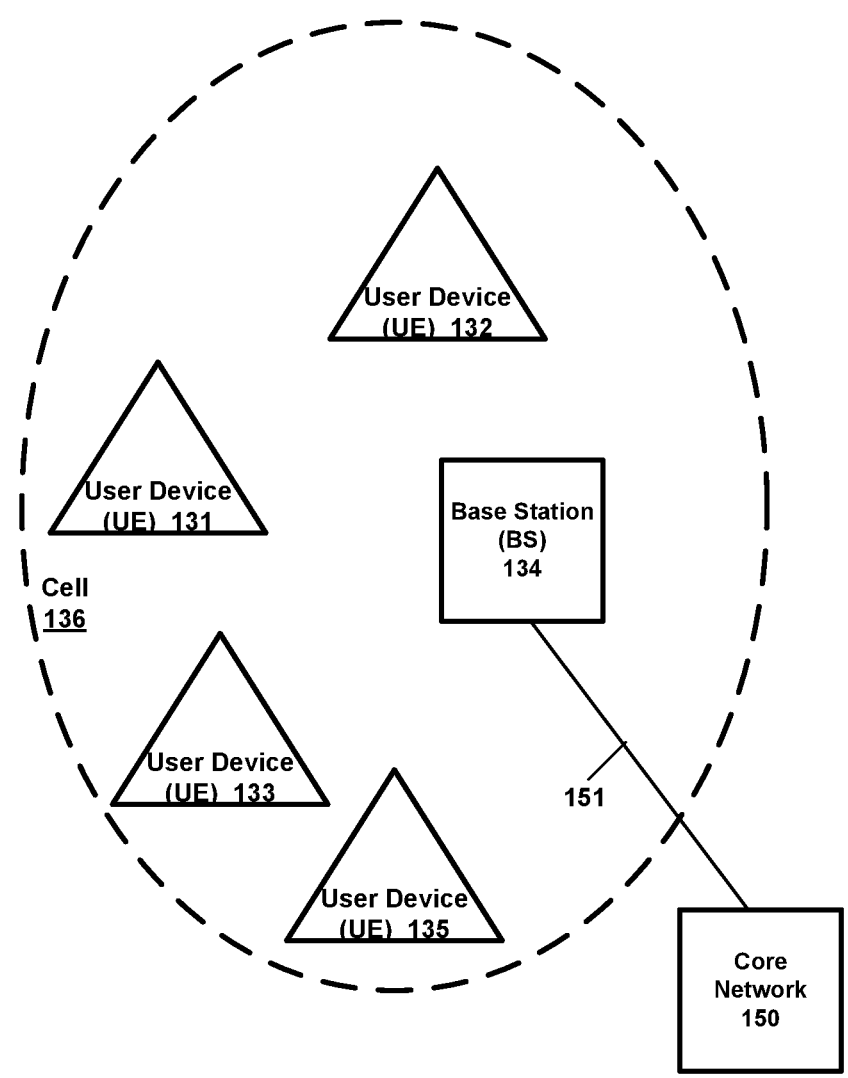
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS). At least part of the functionalities of a BS (e.g., access point (AP), base station (BS) or (e)Node B (eNB), BS, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface or NG interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. A base station may also be DU (Distributed Unit) part of IAB (Integrated Access and Backhaul) node (a.k.a. a relay node). DU facilitates the access link connection(s) for an IAB node.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. A user device may be also MT (Mobile Termination) part of IAB (Integrated Access and Backhaul) node (a.k.a. a relay node). MT facilitates the backhaul connection for an IAB node.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, eMBB, URLLC, NR sidelink communications, etc., or any other wireless network or wireless technology. These example networks, technologies or data service types are provided only as illustrative examples.

There may be shared frequency bands in which one or more existing (or current) users (incumbent users, or incumbent wireless devices, or priority users) of such frequency band may use only a portion of the frequency band or wireless spectrum. In some cases, unused spectrum or resources within such frequency band may be shared or made available to other users or other wireless devices. In that case, the frequency band may be shared with other users or network devices to improve the utilization of resources of such shared frequency band. According to an example embodiment, one or more techniques may be used to allow the new users access to resources of the shared frequency band, while protecting the use of the incumbent users. There may be a wide variety of shared frequency bands that may be used by both incumbent (or original) users as well as one or more additional users or wireless devices, and for different wireless technologies, for which it may be desirable to provide one or more techniques to allocate resources to the new users, while continuing to protect (or preserve) a priority usage of such frequency band by the incumbent users.

As an illustrative example, the Citizens Broadband Radio Service (CBRS) is a lightly licensed band that has a number of existing or incumbent users, such as the US Department of Defense, e.g., US Navy radar and microwave communication links along coast lines of the US, as an illustrative example. The 3.5 GHz spectrum range (or other frequency range) that may be reserved for US Navy radar systems may be significantly under-utilized, e.g., at various locations within the US. Therefore, as an example, at least a portion of this spectrum range is being made available for commercial wireless services. However, the use of this frequency band should be managed so as to protect or preserve the high priority use by the incumbent users of this spectrum.

A shared frequency band may be a frequency spectrum, and may include, or may be divided into, a plurality (e.g., tens, hundreds or thousands) of channels, where each channel may include a subset of (e.g., contiguous) frequency resources within the shared frequency band. A guard band may be provided between adjacent channels, for example. Each channel may occupy a different frequency range within the shared frequency band. In some cases, one or more channels may be allocated to one or more incumbent users.

In one example embodiment, non-incumbent users (or non-priority users), which may be referred to herein as wireless nodes (or wireless devices), or access points/APs. In many examples, the term AP is used as an example wireless node (or example wireless device), but an AP is an example wireless node, and other wireless nodes may be used or provided as non-incumbent or non-priority users of a shared frequency band, for example. Thus, wireless nodes may include any wireless node, e.g., such as access points, base stations, gNBs, eNBs, relay stations, user devices, UEs, IoT devices, network nodes, or other wireless nodes, for WiFi, LTE, NR/5G, or any other wireless technology).

According to an example embodiment, in some cases, wireless nodes, which may like (or need) to use or operate on channel(s) of the shared frequency band, at least in some cases, may be required to register with a controller, such as a spectrum access controller. For example, a spectrum access controller may, e.g., perform spectrum access control for the shared frequency band, e.g., for all or part of the frequency band for CBRS, and may determine geographical, time and frequency usage of the shared frequency band by incumbent (or priority) users, and may control the use or allocation of time/frequency resources to wireless nodes or access points (APs) or other non-incumbent users, in a manner so as to protect or preserve the usage of shared frequency band resources by the priority or incumbent users (e.g., avoid interference by APs with incumbent users within the shared frequency band or CBRS spectrum). Thus, for example, at least in some cases, the spectrum access controller may perform aggregate interference calculations based on wireless nodes (or APs) at different locations (as well as possibly taking into account the location of incumbent user's and assignment or use of specific channels to one or more incumbents), to determine which (non-incumbent) users or wireless nodes and at what operational restrictions (e.g., maximum transmission power, maximum antenna height, . . . ) may use one or more channels within such shared frequency band, e.g., to manage and/or avoid interference with the incumbent users' use of the shared frequency band.

Thus, for example, after proposed (non-incumbent) users or APs have registered with the spectrum access controller, the spectrum access controller may (and/or may periodically) perform aggregate interference calculations to confirm that the requested usage of the resources of the shared frequency band by the (non-incumbent) wireless nodes or AP(s) will not (significantly) impact the incumbent users operating in the same geographical area as one or more APs. Under such an approach (where all usage of the shared frequency band requires registration), at least in some cases, there may be a significant delay after registration before the AP may be permitted to use or operate (e.g., transmit and/or receive signals) via the shared frequency band. Also, for example, there may be a significant delay between when an AP requests a grant (or permission) to transmit via the shared frequency band, and when the controller sends the grant or message indicating the AP may transmit on (or use) the shared frequency band. Moreover, an active AP that deregisters with the spectrum access controller (e.g., for whatever reason, such as a reboot), will typically lose its grant on the shared frequency band, and the AP may have to wait a significant period of time (e.g., 24 hours or more, in some example cases), e.g., after submitting a new grant request, before receiving another grant. Thus, it may be desirable to provide techniques to better utilize shared frequency bands, and allow APs or non-incumbent users more flexibility in spectrum usage, such as to allow APs to more quickly use one or more channels of the shared frequency band that is not being used by (or reserved by or assigned to) incumbent users within an area of the (non-incumbent) wireless node or AP.

According to an example embodiment, different options may be provided to APs (or other wireless nodes or devices, e.g., non-incumbent/non-priority users of the shared frequency band), depending on whether the AP would like to transmit on the same channel(s) within the shared frequency band that is being used by an incumbent user in the area, or whether the AP (or wireless node) would like to transmit on an adjacent channel (a different channel than the channel(s) that are being used by or assigned to/reserved by incumbents/priority users).

Thus, in an illustrative example embodiment, co-channel operation may refer to an AP (or any other wireless node) using or transmitting on a channel that has been assigned to (or reserved by), or is in use by, an incumbent user (e.g., where the incumbent user is associated with a protection zone that encompasses the geographic location of the AP). Also, adjacent channel (where adjacent channel may refer to a different channel than the channel being used by or assigned to an incumbent/priority user) operation may refer to an AP (or other wireless node) using or transmitting on a channel that is not used by or assigned to/reserved by an incumbent user, for example. Example embodiments may allow a (non-incumbent) user or AP to perform adjacent channel operation relatively quickly, since such operation by the AP should not affect the incumbent user (e.g., assuming that the AP is certified to meet Out of Band Emissions (OOE) requirements). Thus, according to an example embodiment, in such case of adjacent channel operation for an AP, AP registration with the spectrum access controller is not required. However, for co-channel (or same channel as used by or assigned to the incumbent) operation by an AP, AP registration with the spectrum access controller may first be required before the AP can receive a grant (or permission) to use or transmit on a co-channel (or same channel that is assigned to an incumbent user that is associated within a protection zone that encompasses the location of the AP). Registration may allow the spectrum access controller, for example, to perform computations to ensure incumbent protection criteria requirements are met based on the AP and other APs (e.g., based on multiple or even all non-incumbent users). For example, after an AP registration, the spectrum access controller may perform aggregate interference calculations to determine whether (or to what degree) the requested usage (by one or more APs or non-incumbent/non-priority users) will negatively impact (or create interference for) the incumbent/priority users use of the shared frequency band. Thus, depending on the resource requirements of the AP, the AP may or may not need to register with the spectrum access controller.

According to an example embodiment, an AP may be in either a registered state with respect to the spectrum access controller wherein the AP has registered (or performed registration) with the spectrum access controller, or an unregistered state with respect to the spectrum access controller wherein the AP has not registered with the spectrum access controller (or such as a case where the AP was previously registered, and then the AP has now become unregistered or deregistered with respect to the spectrum access controller).

Also, according to an example embodiment, channels within the shared frequency band may be either a restricted channel, or an unrestricted channel. According to an example embodiment, a restricted channel for an AP (or other wireless node) may include a channel that the unregistered AP (the AP, which is in an unregistered state with respect to the spectrum access controller) is prohibited from using (e.g., the unregistered AP is prohibited from transmitting signals via the restricted channel). In an example embodiment, a restricted channel for an AP may include a channel, for example, that has been assigned to, or is in use by, an incumbent user associated with a protection zone that encompasses the location of the AP (e.g., for example, within the protection zone, no transmissions by an unregistered AP may be permitted). In an example embodiment, a protection zone may be or may include a geographical area within which transmission on at least one channel is either not allowed or is allowed with operational restrictions. In an example embodiment, a protection zone may include a geographic area or zone, associated with an incumbent user(s), for which incumbent protection (e.g., protection or preservation of the incumbent's use of one or more channels) will be provided by the spectrum access controller.

Also, according to an example embodiment, an unrestricted channel may include a channel for which transmissions are permitted by a registered AP or an unregistered AP. In other words, an AP may transmit signals via an unrestricted channel even if the AP is not registered with the spectrum access controller (the AP is in an unregistered state with respect to the spectrum access controller). Thus, in an example embodiment, an AP that is in a registered state or in an unregistered state with respect to the spectrum access controller, may use or transmit signals via an unrestricted channel for the AP.

Thus, according to an example embodiment, a method may include receiving, by an AP (or wireless node) from a spectrum access controller for a shared frequency band, information (e.g., provided via a spectrum inquiry response, a grant response, or other response) indicating at least one restricted channel for the AP within the shared frequency band, wherein the AP is permitted to transmit signals via the at least one restricted channel only if the AP is in a registered state with respect to the spectrum access controller; transmitting signals, by the AP, via the at least one restricted channel, while the AP is in a registered state with respect to the spectrum access controller; and transmitting signals, by the AP, via the at least one unrestricted channel within the shared frequency band, while the AP is in either the registered state or an unregistered state with respect to the spectrum access controller, wherein the at least one unrestricted channel is at least one channel that is not part of the at least one restricted channel (the unrestricted channels are different from the restricted channels). Also, for example, the AP may be prohibited from transmitting signals on the at least one restricted channel if the AP is in the unregistered state with respect to the spectrum access controller.

Therefore, according to an example embodiment, the AP may quickly be able to operate on (or transmit and/or receive via) one or more unrestricted channels for the AP (which may be based on the geographic location of the AP, and any protection zones) without being registered. Thus, the AP may be able to transmit on an unrestricted channel (regardless whether the AP is in a registered state or an unregistered state). Also, for example, if the AP requires additional resources, the AP may register with the spectrum access controller, and then receive a grant to transmit via one or more restricted channels.

According to an example embodiment, the method may further include sending, by the AP to the spectrum access controller, a request (e.g., a spectrum inquiry request, or a grant request), including information indicating at least a location of the access point; wherein the receiving includes: receiving, by the AP from a spectrum access controller for a shared frequency band, a response (e.g., a spectrum inquiry response, or a grant response) including information indicating, based on at least the location of the access point, at least one restricted channel within the shared frequency band, wherein the AP is permitted to transmit signals via the at least one restricted channel only if the AP is in a registered state with respect to the spectrum access controller.

In an example embodiment, restricted channels may be specific to an AP (and may be, for example, based on the geographic location of the AP, with respect to any protection zones associated with incumbent user(s), such as whether the location of the AP is within a protection zone).

In an example embodiment of the method indicated above, the receiving may include receiving, by the AP (or other wireless node) from the spectrum access controller, information indicating at least one restricted channel and indicating at least one unrestricted channel for or within the shared frequency band (note, for example, that restricted channels and/or unrestricted channels may be AP-specific and/or AP location specific); wherein the AP is permitted to transmit signals via the at least one restricted channel if the AP is in a registered state with respect to the spectrum access controller and is prohibited from transmitting signals via the at least one restricted channel if the AP is in an unregistered state with respect to the spectrum access controller; and wherein the AP is permitted to transmit signals via the at least one unrestricted channel regardless whether the AP is in the registered state or the unregistered state with respect to the spectrum access controller.

In an example embodiment, the AP may receive operational (e.g., transmission) restrictions for a restricted channel(s) and/or for an unrestricted channel(s). By way of example, operational restrictions for a channel may include, e.g., transmission restrictions, such as, a maximum transmission power, a maximum antenna height, time restrictions for transmission (e.g., transmission is allowed for next x ms), or other operational restrictions. For example, operational restrictions for a restricted channel may be referred to as restricted channel operational restrictions, and may be provided by the spectrum access controller to a registered AP via a grant response sent to the AP that grants or permits the AP to use a restricted channel. Likewise, operational restrictions for an unrestricted channel may be referred to as unrestricted channel operational restrictions, and may be conveyed or communicated to the (registered or unregistered) AP via a spectrum inquiry response sent by the spectrum access controller.

Figure 2:
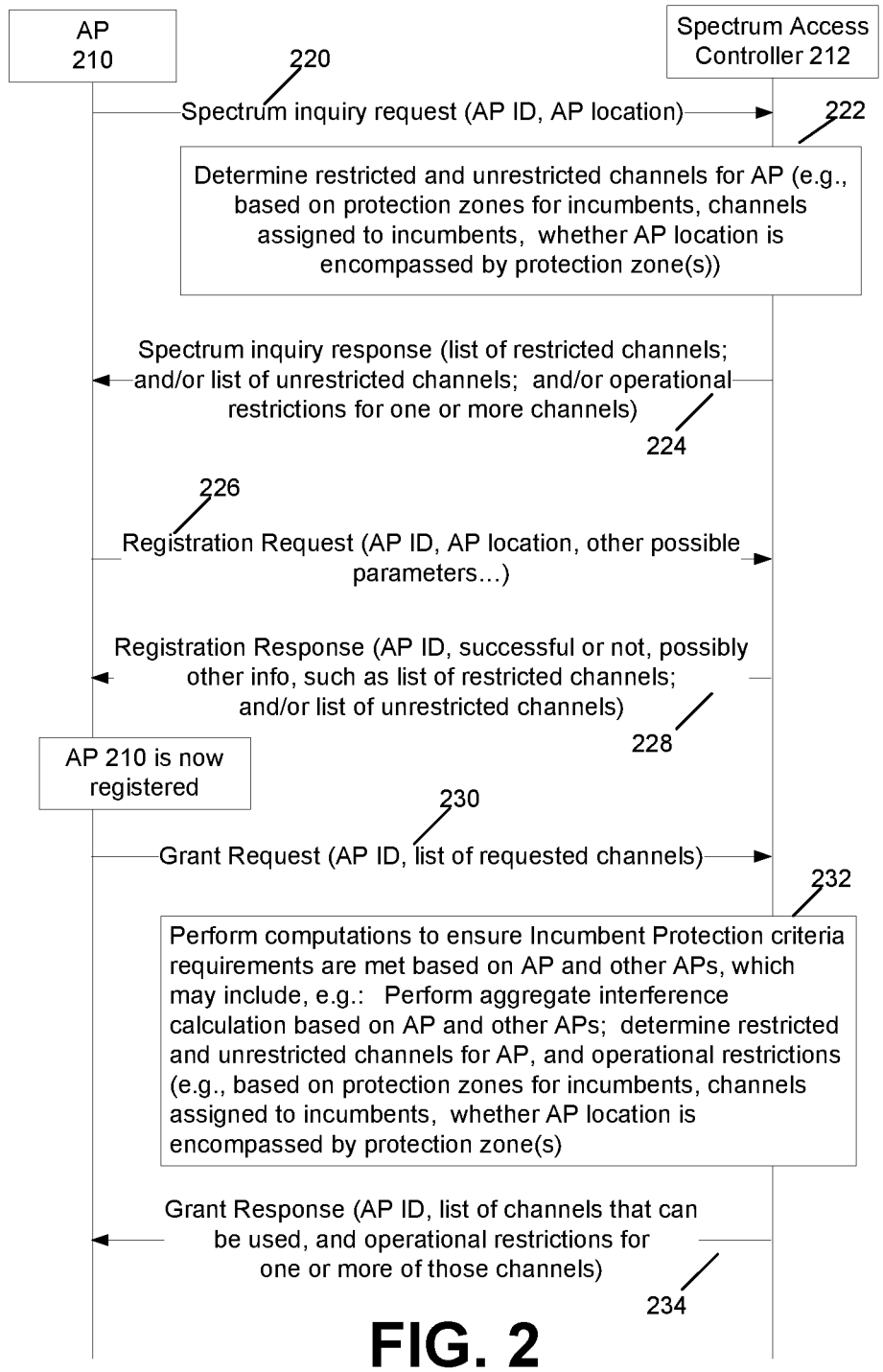
FIG. 2 is a signaling diagram illustrating a spectrum inquiry procedure, a registration procedure, and a grant procedure, according to example embodiments.

FIG. 2 is a signaling diagram illustrating a spectrum inquiry procedure, a registration procedure, and a grant procedure, according to example embodiments. An AP 210 may be in communication with spectrum access controller 212.

A spectrum inquiry procedure may be used by an AP (or other non-incumbent or non-priority user of the shared frequency band) to obtain a list of one or more restricted channels (which may also be referred to as blacklisted channels) and/or a list of one or more unrestricted channels (which may also be referred to as whitelisted channels), for or with respect to the requesting AP. In an example embodiment, the list of restricted channels and/or list of unrestricted channels may be AP-specific (or user specific), as such lists of channels (including which channels are restricted, e.g., due to use by or assignment (of such restricted channel) to an incumbent user associated with a protection zone that encompasses the AP location) may be based on a geographic location of the AP. Thus, each incumbent (or incumbent user, or priority user, such as the Navy or DoD use of microwave and RADAR transmissions within the CBRS, as an illustrative example) may be associated with one or more protection zones. According to an illustrative example embodiment, a channel assigned to or in use by an incumbent (or priority) user may not be listed as an unrestricted for an AP if a geographic location of such AP is included within (or encompassed by) the protection zone. Rather such channel (which is in use by an incumbent user) should be indicated to the AP as a restricted channel for the AP (based on the AP location with respect to the protection zone), to prohibit the AP (which is at a location within the incumbent user's protection zone) from using or transmitting on such channel, if the AP is unregistered. On the other hand, for example, if the AP is not located within the protection zone, then such channel may be listed as an unrestricted channel for the AP (but such channel may be listed as a restricted channel for another AP that happens to be located within the protection zone of the incumbent). Thus, according to an example embodiment, the list (or identification) of restricted channels and/or unrestricted channels within the spectrum inquiry procedure may be AP-specific, e.g., since a determination of which channels are restricted and unrestricted may depend on the location of the AP. Thus, for example, the indication of which channels are restricted channels and/or unrestricted channels may be location-specific. The spectrum inquiry procedure may be performed by an AP that is in either registered state or unregistered state with respect to the spectrum access controller.

An example spectrum inquiry procedure may include operations 220, 222 and/or 224. At 220, the AP 210 (or other non-incumbent user) may send a spectrum inquiry request (e.g., including the AP identity (AP ID) and AP location and/or other parameters or fields) to spectrum access controller 212. The AP location may be indicated, e.g., via GPS (Global Positioning System) coordinates (e.g., for an outdoor AP), an address (e.g., for an indoor or outdoor AP), or other location identification. As described above, at 222, the spectrum access controller 212 may determine a list of restricted channels and/or a list of unrestricted channels for AP 210 (e.g., based on the location of AP 210, whether the location of AP 210 is within or encompassed by one or more incumbent user protection zones, or other criteria). At 224, the spectrum access controller 212 may send a spectrum inquiry response to the AP 210 (including the AP ID, and a list of restricted channels, a list of unrestricted channels, and/or unrestricted channel operational restrictions for one or more of the unrestricted channels). The unrestricted channel operational restrictions may indicate one or more restrictions or requirements for the use or transmission of a signal via an unrestricted channel by an unregistered AP (or by a registered AP operating in an unregistered mode of operation with respect to such channel). Thus, for example, an operational restriction may indicate a maximum transmission power, e.g., 30 dBm for an unrestricted channel listed in the response 224. The AP 210 may be required to periodically perform the spectrum inquiry procedure in order to receive an updated list of restricted channels and/or unrestricted channels, and/or operational restrictions for the unrestricted channels (e.g., since protection zones may change, and channels assigned to, or in use by, incumbents, may change over time).

The AP 210 may then elect to use (e.g., transmit and/or receive signals via) any indicated unrestricted channels, in accordance with any operational restrictions for such unrestricted channel(s). The AP 210 is prohibited from using (e.g., transmitting and/or receiving signals via) a restricted channel while in an unregistered state with respect to the spectrum controller. Thus, for example, if the listed unrestricted channel(s) provide sufficient resources for the AP 210, then the AP 210 may not need to register with the spectrum access controller 212 to access the restricted channels of the shared frequency band.

A registration procedure for AP 210 may include operations 226 and 228 in FIG. 2. At 226, the AP 210 may send a registration request to the spectrum access controller 212. The registration request may include, e.g., the AP ID, AP location, and other possible fields or parameters, such as AP capabilities, AP installation parameters, e.g., such as antenna type, height, orientation and configuration. At 228, the spectrum access controller may send a registration response, including the AP ID, an indication of whether the registration of the AP 210 was successful or not (whether the AP 210 is now registered or unregistered), and possibly other information. Although the AP 210 may be registered with the spectrum access controller, the AP 210 may need to obtain a grant (via the grant procedure) of one or more channels to permit the AP 210 to use or transmit on one or more restricted channels (and/or to allow the registered AP to transmit via an unrestricted channel using may be less restrictive or more favorable operational restrictions, after receiving a grant response, which may indicate different e.g., less restrictive operational restrictions for such unrestricted channel). For example, the registration response at 228 may indicate a list of the unrestricted channels (and any operational restrictions for such unrestricted channels) for AP 210, so that the AP 210 may use or transmit on these unrestricted channels immediately, without necessarily requiring the AP 210 to perform the spectrum inquiry procedure.

After the AP 210 is registered (in a registered state with respect to the spectrum access controller 212), the AP 210 may then perform the grant procedure (e.g., including operations 230, 232 and/or 234) to obtain a grant or permission to transmit via one or more restricted channels. Thus, at 230, the AP 210 may send a grant request to the spectrum access controller. The grant request may include the AP ID, and a list of the channels that the AP 210 would like to transmit on, for example.

At 232, the spectrum access controller may perform computations to ensure Incumbent Protection criteria requirements are met based on AP and other APs. For example, at 232, the spectrum access controller may determine which channels the AP 210 may use, and with which operational restrictions. For example, the spectrum access controller may perform an aggregate interference calculation where an estimate of the interference experienced by one or more incumbent users is estimated based on proposed transmissions from one or more APs (or non-incumbent users), e.g., taking into account incumbent user protection zones, channels assigned to or in use by various incumbent users, locations of the APs, and the capabilities and/or configurations of the various APs (e.g., AP location, AP capabilities and/or AP configuration information may have been provided by AP to the spectrum access controller 212 via registration request at 226).

At 234, the spectrum access controller may send a grant response to the AP 210, including the AP ID, and a list of channels that may be used by the AP 210 while AP 210 is in a registered state, and any operational restrictions for one or more of the indicated channels. In an example embodiment, the list of channels in the grant response (providing permission to the AP 210 to transmit on such channels) may include either or both channels that would have been indicated to the AP 210 as restricted and unrestricted if the AP 210 had performed a spectrum inquiry procedure, for example. Thus, for example, the registration procedure, and/or the grant procedure, may be used by the AP 210 to obtain permission to use one or more restricted channels (e.g., permitting co-channel operation by the AP 210, but possibly with certain operational restrictions on such channels).

The list of channels provided by indicated by the grant response at 234 may also include an unrestricted channel(s) for the AP (e.g., channels that would have been listed as unrestricted for the AP 210, via an spectrum inquiry response). In an example embodiment, the operational restrictions for the unrestricted channel indicated in the grant response 234 may be different than the operational restrictions indicated in a spectrum inquiry response at 224 for the same unrestricted channel. For example, based on additional configuration or capabilities parameters and possibly interference calculations performed by the spectrum access controller 212, the operational restriction for the unrestricted channel indicated in the grant response at 234 may be less restrictive than the operational restrictions for the same unrestricted channel indicated in a spectrum inquiry response. For example, the grant response at 234 may indicate a maximum transmission power on the unrestricted channel of 35 dBm (for the AP 210, while the AP is in a registered state), while the spectrum inquiry response may indicate a maximum transmission power of only 30 dBm for the same unrestricted channel for the AP 210. Thus, the AP 210 may elect to transmit signals at 35 dBm via the unrestricted channel while registered and operating in a registered mode of operation, and the AP 210 may elect to transmit signals at 30 dBm via the unrestricted channel while operating in an unregistered mode of operation. The AP 210 may (or may continue to) transmit signals at the 30 dBm transmission power via the unrestricted channel (operating in unregistered mode of operation), even if the AP 210 becomes unregistered with the spectrum access controller. Or, if the AP is transmitting at 35 dBm (registered mode of operation) on the unrestricted channel, and then the AP transitions from registered state to unregistered state, the AP will decrease its transmission power on this unrestricted channel from 35 dBm (operational restriction for channel for the AP in registered state) to 30 dBm (the more restrictive operational restriction for the same unrestricted channel for the AP in unregistered state). Also, in an example embodiment, the AP may transmit, at the same time, via both a restricted channel and an unrestricted channel, e.g., based on multi-carrier aggregation, for example, or other technique.

Thus, for example, if the AP 210 is in a registered state, the AP 210 may operate in different modes (e.g., an unregistered mode, and a registered mode) of operation, with respect to different channels or frequency resources of the shared frequency band. For example, the AP 210 may operate in a registered mode of operation for one or more channels (e.g., transmitting signals in accordance with the operational restrictions indicated in the grant response), while operating in an unregistered mode of operation for one or more channels (e.g., channels that may have been indicated as unrestricted via a spectrum inquiry response, for example), by transmitting signals in accordance with operational restrictions for such unrestricted channel provided by the spectrum inquiry response. Thus, for example, the mode of operation may refer to, or may include, the AP 210 using (e.g., transmitting signals) via a channel in accordance with operational restrictions (for the channel) associated with (or indicated for) the mode of operation (either operational restrictions indicated by a grant response for a registered mode of operation, or operational restrictions indicated by a spectrum inquiry response for (or which may be used for) an unregistered mode of operation).

Thus, in an example embodiment, both adjacent channel (channels that are different from the channels used by or assigned to an incumbent user) operation (via unrestricted channels for the AP, with registration not required) and co-channel operation (via restricted channels for the AP, after registration) for an AP (or other non-incumbent user device) may be supported. There may be scenarios where adjacent band operation does not meet the deployment needs due to power restrictions or capacity, which could be a by-product of interference from other users, or not enough channel bandwidth. For all these scenarios, it may be beneficial to provide a spectrum access controller with information on the AP's deployed location and installation parameters (e.g., via a registration request) and in exchange (e.g., during a grant procedure) the spectrum access controller may provide a grant or permission to use one or more channels (e.g., including one or more restricted channels for the AP), and the operational parameters with which the AP can operate in the co-channel and/or adjacent channel (e.g., when the AP is in a registered state). According to an example embodiment, this scenario may require AP registration with the spectrum access controller and the spectrum access controller would then have the information to track and control interference for (or with respect to) one or more incumbent users, e.g., to protect the incumbent user's use of the shared frequency band, and/or ensure that interference from the APs (or non-incumbents users) with respect to the incumbent users does not occur or is less than a threshold amount.

According to an example embodiment, two states and/or two modes of operation for an AP or non-incumbent user may be provided, e.g., such as an unregistered state in which the AP can perform adjacent channel operation via use of unrestricted channels, and a registered state that may allow the AP to perform co-channel operation via use of restricted channels. With these two options for using a shared frequency band, there may be multiple types of APs or wireless nodes/devices, such as, for example:

Low Cost Device: Allows for only Adjacent Channel Operation (via use of only unrestricted channels), and no registration is required with the spectrum access controller. These devices may include, for example, cheaper or less expensive and/or less complex devices, e.g., without the need of complex interface certification with the spectrum access controller. Performance may be limited but it is well suited for a number of scenarios such as fixed wireless access (FWA), and/or deployments in areas where there are minimal number of incumbents (and thus, a significant number of unrestricted channels). Also, less expensive IoT devices and the like, may also be another example of a low cost device that may take advantage of access to unrestricted channels without the requirement to perform registration.

Enhanced Device: Allows for Adjacent Channel operation (via unrestricted channels) and Co-channel Operation (e.g., via restricted channels). These devices may allow for quick setup, tests, verification and initial service provisioning via unrestricted channels, while registration with spectrum access controller and grants are requested and obtained. These devices may have the capability to operate in 3 different modes of operation, for example:

a) Registered mode for Co-channel and Adjacent channel operation. This operation mode is beneficial if adjacent channel operation without registration is restricted for its operational parameters, e.g., power or antenna type/installation restrictions. This operation mode allows to fully exploit all the band resources in a given location. In this case, the AP may register, obtain a list of channels (including some that may be restricted, and some that may be unrestricted for the AP), and operational restrictions for one or more of these channels, to allow access to increased time frequency resources (to allow access to a set of restricted channels, or via co-channel operation).

b) Registered mode for Co-channel operation and Unregistered mode for Adjacent band operation. In an illustrative example of this hybrid mode of operation, the AP is in a registered state with respect to the spectrum access controller, and the AP may: 1) use (e.g., transmit via) one or more restricted channels in a registered mode of operation, e.g., where the AP may transmit via the restricted channels according to the operational requirements for these channels, which the operational requirements for these channels may be indicated to the AP via a grant response; and 2) use (e.g., transmit signals via) one or more unrestricted channels, according to operational requirements for these unrestricted channel(s), where the operational restrictions for these unrestricted channel(s) may have been provided to the AP via a spectrum inquiry response.

c) Unregistered mode where the device would operate like a Low-Cost Device (e.g., transmitting signals only via unrestricted channels, based on unrestricted channel operational restrictions for such channels indicated to the AP via a spectrum inquiry response). This operation mode can be used as fallback anytime the device needs to deregister or becomes unregistered. It can ensure a minimum of service continuity during registration and/or re-registration and/or grant assignment processes.

For example, the different device types and operational modes described above may allow for a quick introduction of services in new shared frequency bands via the Low-Cost Devices, providing the spectrum access controller and Enhanced Devices longer development and certification times to meet the ecosystem needs.

Thus, for example, a central controller providing different states (Registered and Unregistered states), and/or different modes of operation, may allow for a higher spectral efficiency of the shared frequency band without trading off quick access to spectrum resources, enabling low cost devices, fast time to market or use of interference tracking.

According to an example embodiment, a spectrum access controller may implement or perform procedures to support devices which are in either a registered state or a unregistered state. For example, two distinct types of devices may be defined or used or supported, such as, e.g., Low-Cost Devices and Enhanced Devices. The Low-Cost Devices are limited to an unregistered state with respect to the spectrum access controller, and may operate in an unregistered mode and may follow an operational state diagram similar to the diagram of FIG. 4. Also, an Enhanced Device may be in either a registered state or an unregistered state with respect to the spectrum access controller, and may operate in an unregistered mode, a registered mode, or both modes at the same time with respect to different channels (e.g., AP being in a registered state, and operating in a registered mode with respect to a restricted channel according to operational restrictions for such channel obtained via a grant procedure, and operating in an unregistered mode with respect to an unrestricted channel according to unrestricted channel operational conditions for such unrestricted channel that may be obtained by the AP while in an unregistered state and/or via a spectrum inquiry procedure, for example).

Figure 3:
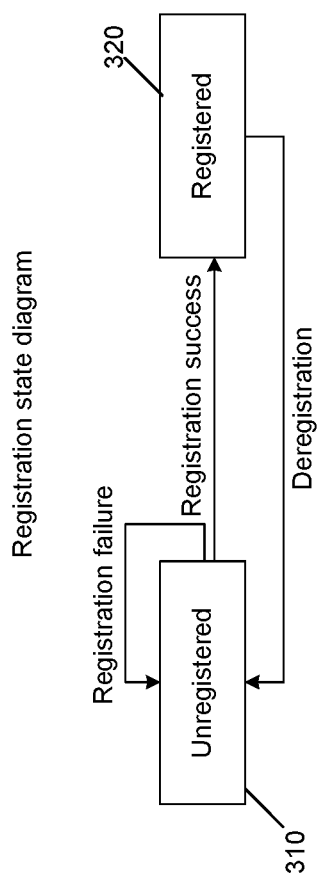
FIG. 3 is a registration state diagram according to an example embodiment.

FIG. 3 is a registration state diagram according to an example embodiment. Initially, an AP may be in an unregistered state 310 with respect to the spectrum access controller. The AP may attempt registration by sending a registration request (e.g., see 226) to the spectrum access controller. If there is registration failure (registration attempt fails), then the AP continues to be in the unregistered state 310. If there is registration success (e.g., registration response 228 indicating a successful registration), then the AP is in a registered state 320 with respect to the spectrum access controller. If there is an event that causes a deregistration of the AP (e.g., AP powers off or re-boots, or a message from the spectrum access controller indicating deregistration), then the AP is then in the unregistered state 310.

Figure 4:
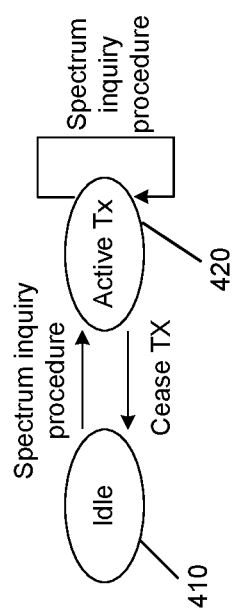
FIG. 4 is a diagram illustrating an unregistered operational state diagram according to an example embodiment.

FIG. 4 is a diagram illustrating an unregistered operational state diagram according to an example embodiment. While in an unregistered state, an unregistered AP may be idle 410 (e.g., or an idle state 410, where the AP has not performed a spectrum inquiry procedure). The unregistered AP may then perform a spectrum inquiry procedure to obtain a list of restricted and/or unrestricted channels, and may begin transmitting signals via one or more unrestricted channels, causing the unregistered AP to become (or transition to) an active transmitting AP 420 (or transition to an active transmitting unregistered AP 420). The unregistered AP (at state 420) may be required to periodically perform the spectrum inquiry procedure, in order to remain active 420 (e.g., to be able to transmit signals via an unrestricted channel). If the unregistered AP, at state 420, ceases transmitting signals on an unrestricted channel, and/or fails to periodically perform a spectrum inquiry procedure, the AP may transition back to an unregistered idle state 410.

Figure 5:
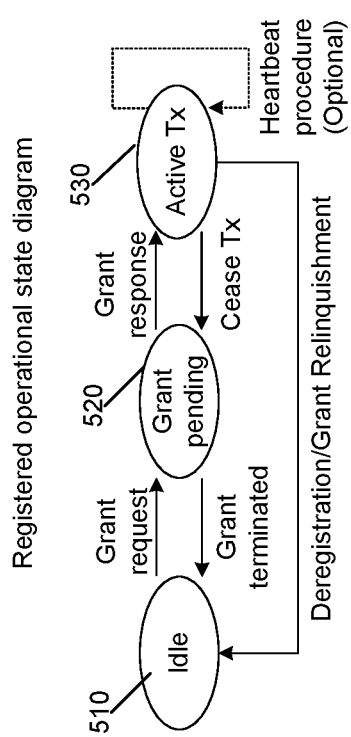
FIG. 5 is a diagram illustrating a registered operational state diagram according to an example embodiment.

FIG. 5 is a diagram illustrating a registered operational state diagram according to an example embodiment. Initially, the registered AP may be idle 510 (registered idle state 510). The idle registered AP (at 510) may send a grant request 230, causing the AP to transition to registered grant pending state 520. If a grant response 234 is received by the registered AP (at 520), then the registered AP transitions to a registered active transmitting state 530. The AP may be required to periodically perform a heartbeat procedure with the spectrum access controller, where the AP may periodically send its AP ID, and any current or updated parameters or configurations, and then may receive an updated grant (e.g., with updated list of channels and/or an updated operational restrictions). If the active registered AP (at 530) ceases transmitting, the registered AP transitions back to the grant pending state 520. If the grant (or permission) is terminated, then the registered AP transitions back to the registered idle state 510. Or while at registered active transmitting state 530, if a deregistration request is received by the AP from the spectrum access controller or if the AP sends a grant relinquishment to the spectrum access controller, then the AP transitions back registered to idle state 510.

In unregistered state (e.g., see FIG. 4), the AP may initiate or perform the spectrum inquiry procedure via which the spectrum access controller will inform the AP of unrestricted (e.g., available) channels in its area. The spectrum access controller may have (or may determine) predefined protection zones for each incumbent, and these protection zones may change over time. In an example embodiment, these protection zones do not need to be defined extremely conservatively since they will only apply to APs in the unregistered state. The spectrum inquiry request (220, FIG. 2) may contain at least the geographical location of the AP and possibly some installation parameters such as indoor vs outdoor install, etc. Based on the information provided in the spectrum inquiry request, the spectrum access controller can provide (e.g., via spectrum inquiry response (224, FIG. 2)) information indicating at least a list of restricted channels (which may also be referred to as a blacklist of channels) for the AP, which are prohibited for use by the AP while in an unregistered state, and/or a list of unrestricted channels (which may also be referred to as a whitelist of channels), which may be used by the AP even if in unregistered state, along with possibly some operational restrictions per channel (e.g., for the unrestricted channels, since the AP is prohibited from using the restricted channels while in unregistered state). The blacklist of channels (or list of restricted channels) may, for example, be derived from the channels associated with all the overlapping protection zones in the AP's location. This, for example, may ensure that co-channel operation by the AP is prohibited while the AP is unregistered. The whitelist of channels (or list of unrestricted channels) may include for example, all the adjacent channels (the channels not used by incumbent users) for the incumbent users deployed in the area of operation of the AP (e.g., channels that are not used by incumbent users having a protection zone that encompasses or overlaps with the AP). The spectrum access controller may further protect these unrestricted channels (or whitelist of channels) by including operational restrictions for one or more of these channels, e.g., indicating a maximum transmission power, or restricting a maximum EIRP (Equivalent Isotropically Radiated Power) for certain channels.

Figure 6:
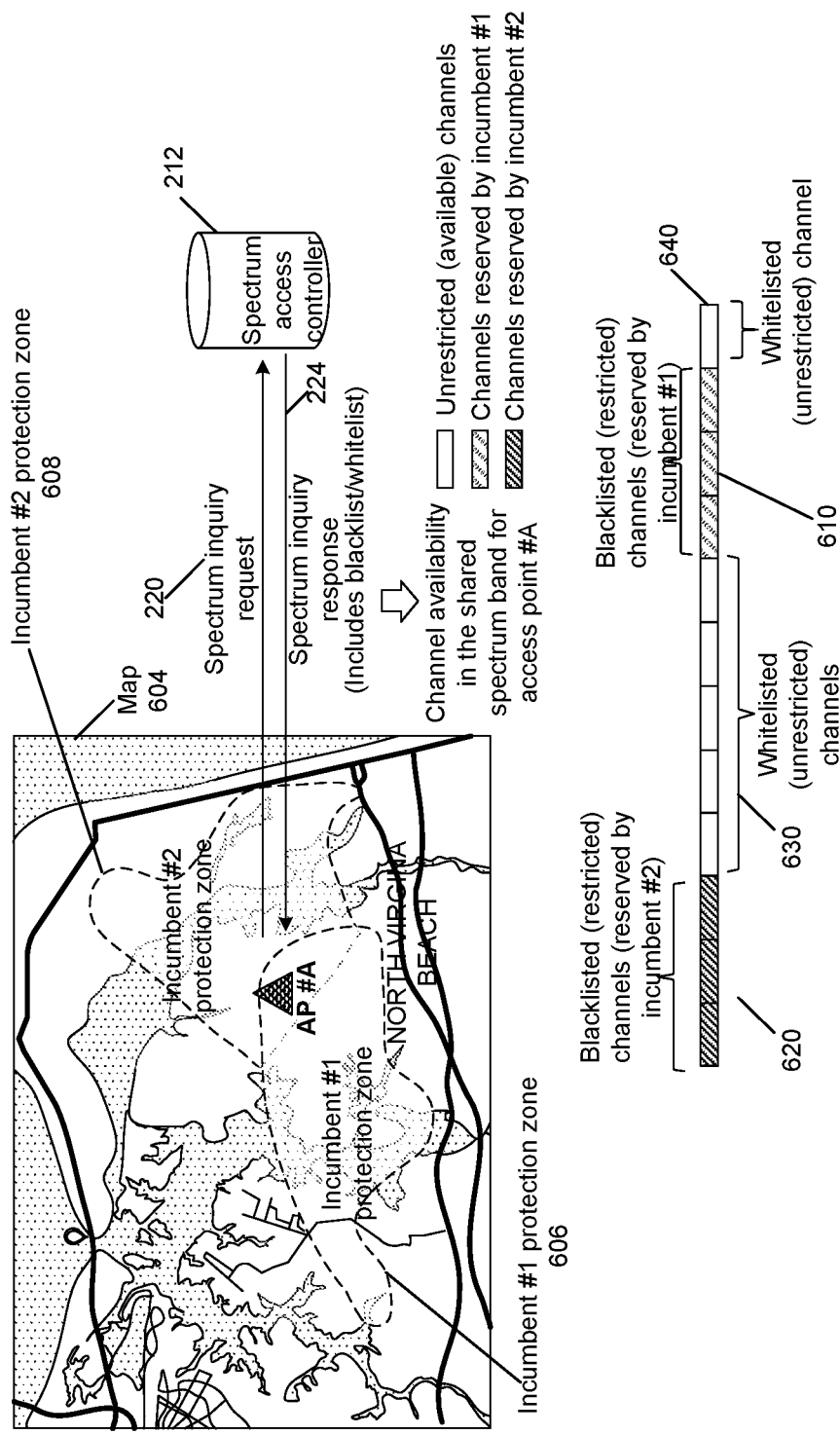
FIG. 6 is a diagram of a wireless node or a non-incumbent user, operating in unregistered mode with two incumbent users according to an example embodiment.

FIG. 6 is a diagram of a wireless node or a non-incumbent user, operating in unregistered mode with two incumbent users according to an example embodiment. The two incumbent users are incumbent #1, and incumbent #2, for example. A location of AP #A is shown on a map 604. The location of AP #A is encompassed by (or within) a protection zone 606 for incumbent #1, and a protection zone 608 for incumbent #2. As shown, AP #A may send a spectrum inquiry request 220 to spectrum access controller 212 (e.g., indicating the AP ID and location of AP #A), and the spectrum access controller 212 may send a spectrum inquiry response that may indicate a blacklist of channels or list of restricted channels for AP #A, and/or a whitelist of channels or list of unrestricted (or unused or available) channels for AP #A, and/or operational restrictions for one or more of the channels. In this illustrative example shown in FIG. 6, the spectrum inquiry response 224 may indicate all restricted channels for the AP #A, including the restricted channels 610 reserved by incumbent #1, and restricted channels 620 reserved by incumbent #2. Also, the spectrum inquiry message 224 may also indicate the unrestricted (or available) channels for the AP #A, e.g., such as the unrestricted channels 630, and unrestricted channel 640, as an illustrative example.

With reference to FIG. 6, if the unrestricted channels (630 and 640) are sufficient resources for the AP #A, then the AP #A may not need to register with the spectrum access controller 212. On the other hand, if the unrestricted channels (630 and 640) are insufficient for AP #A, then AP #A may initiate a registration procedure by sending a registration request (e.g., 226, FIG. 2) to the spectrum access controller 212. For example, if a third incumbent (incumbent #3, not shown in FIG. 6) is present with an associated protection zone that encompasses the AP #A and reserved the channels 630, this may leave only the channel 640 as unrestricted for the AP #A. This may be insufficient resources for the AP #A, causing the AP #A to send a registration request to obtain access to the restricted channels 610, 620, 630.

In an example embodiment, an AP in a registered state may request (e.g., via grant request) additional resources from the spectrum access controller 212. In some cases, a target, or goal for the spectrum access controller, for registered devices/APs is to provide the AP a largest amount of spectrum with the least restrictions possible, while protecting or preserving the resources used by the incumbent user(s). As opposed to the loosely defined protection zones the spectrum access controller may use for unregistered state devices, the spectrum access controller, in response to a grant request from a registered AP, may perform complex computational tasks to determine and/or maximize the spectral efficiency and utilization of the band, for example. Once the spectrum access controller has performed the required calculations to ensure interference protection for incumbents, it may provide information on operational parameters for the different allowed channels to the AP via the grant response. Based on the grants provided by the spectrum access controller, the AP may operate in the same and/or adjacent channel as the incumbents in the area since the complex interference calculations may allow for more relaxed protection zones.

In an example embodiment, the spectrum access controller may provision an offline access method for preliminary assessment of the channel availability in a specific geographical region. This would allow operator or end users to appropriately select the capabilities of the AP's required for their deployment.

Also, according to an example embodiment, a spectrum access controller, and/or operation of APs (non-incumbent users) of a shared frequency band may provide or implement different state machines or registration options depending on co-channel assignments with incumbents and/or adjacent channel with incumbents in a specific area(s), and which may allow for higher spectral efficiency and utilization of the shared band without trading off quick access to spectrum resources, enabling low cost devices, fast time to market and/or means for interference tracking.

Various example embodiments may improve frequency resource utilization, by allowing, e.g., unregistered users (e.g., APs) to quickly access or use unrestricted channels without registering with the spectrum access controller, while allowing the user (or AP) an option to initiate registration with the spectrum access controller to obtain access to additional frequency resources (e.g., restricted channels) of the shared frequency band.

Example 1

Figure 7:
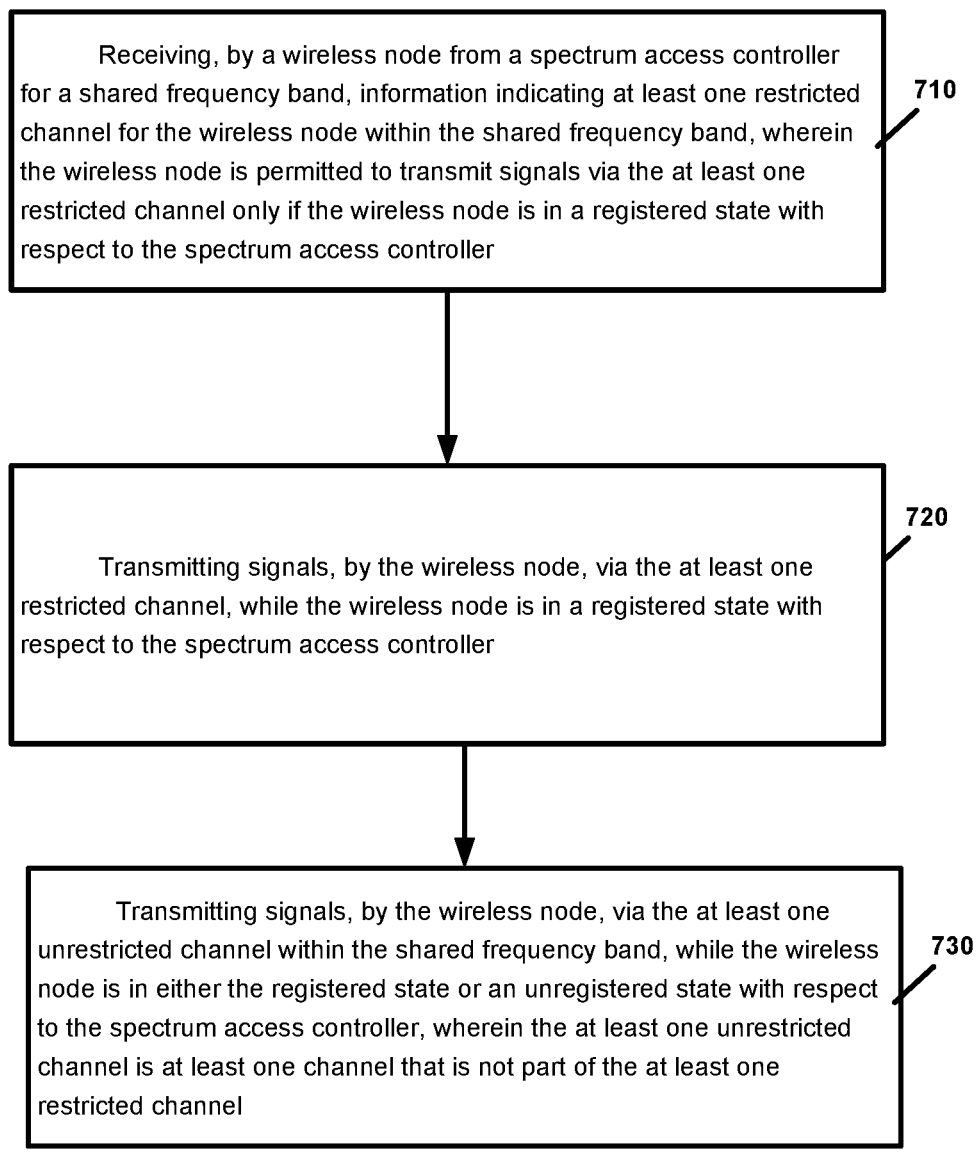
FIG. 7 is a flow chart illustrating operation of a non-incumbent user or wireless node according to an example embodiment.

FIG. 7 is a flow chart illustrating operation of a non-incumbent user or wireless node according to an example embodiment. Operation 710 includes receiving, by a wireless node from a spectrum access controller for a shared frequency band, information indicating at least one restricted channel for the wireless node within the shared frequency band, wherein the wireless node is permitted to transmit signals via the at least one restricted channel only if the wireless node is in a registered state with respect to the spectrum access controller. Operation 720 includes transmitting signals, by the wireless node, via the at least one restricted channel, while the wireless node is in a registered state with respect to the spectrum access controller. And, operation 730 includes transmitting signals, by the wireless node, via the at least one unrestricted channel within the shared frequency band, while the wireless node is in either the registered state or an unregistered state with respect to the spectrum access controller, wherein the at least one unrestricted channel is at least one channel that is not part of the at least one restricted channel.

Example 2

The method of Example 1 wherein the wireless node is prohibited from transmitting signals on the at least one restricted channel if the wireless node is in the unregistered state with respect to the spectrum access controller.

Example 3

The method of any of Examples 1-2, further comprising: sending, by the wireless node to the spectrum access controller, a request, including information indicating at least a location of the wireless node; wherein the receiving comprises: receiving, by a wireless node from a spectrum access controller for a shared frequency band, a response including information indicating, based on at least the location of the wireless node, at least one restricted channel within the shared frequency band, wherein the wireless node is permitted to transmit signals via the at least one restricted channel only if the wireless node is in a registered state with respect to the spectrum access controller.

Example 4

The method of Example 3, wherein: the request is a spectrum inquiry request; and the response is a spectrum inquiry response.

Example 5

The method of any of Examples 1-4 wherein the receiving comprises: receiving, by the wireless node from the spectrum access controller, information indicating at least one restricted channel and indicating at least one unrestricted channel for or within the shared frequency band; wherein the wireless node is permitted to transmit signals via the at least one restricted channel if the wireless node is in a registered state with respect to the spectrum access controller and is prohibited from transmitting signals via the at least one restricted channel if the wireless node is in an unregistered state with respect to the spectrum access controller; and wherein the wireless node is permitted to transmit signals via the at least one unrestricted channel regardless whether the wireless node is in the registered state or the unregistered state with respect to the spectrum access controller.

Example 6

The method of Example 5, wherein the receiving further comprises: receiving, by the wireless node from the spectrum access controller, transmission restrictions, associated with the at least one unrestricted channel, that are required to be followed by the wireless node when transmitting signals, by the wireless node, via the at least one unrestricted channel within the shared frequency band.

Example 7

The method of any of Examples 1-6: wherein the at least one restricted channel comprises at least one channel that has been assigned to, or is in use by, an incumbent user associated with a protection zone that encompasses the location of the wireless node (and within the protection zone no transmissions by an unregistered access point are permitted); and wherein the at least one unrestricted channel comprises a channel for which transmissions are permitted by a registered or an unregistered access point.

Example 8

The method of Example 7, wherein, for the at least one unrestricted channel, operational restrictions are provided for the at least one unrestricted channel if a protection zone applies for the at least one unrestricted channel, and wherein operational restrictions are not provided for the at least one unrestricted channel if a protection zone applies for the at least one unrestricted channel.

Example 9

The method of any of Examples 1-8, further comprising transitioning, by the wireless node, from the unregistered state with respect to the spectrum access controller to the registered state with respect to the spectrum access controller, including: sending, by the wireless node to the spectrum access controller, a registration request, including at least a wireless node identifier to identify the wireless node, and the location of the wireless node; and receiving, by the wireless node, a registration grant that indicates the wireless node has been registered with respect to the spectrum access controller.

Example 10

The method of Example 9, further comprising: sending, by the wireless node to the spectrum access controller, a grant request to request a grant or permission to transmit via the at least one restricted channel; and, receiving, by the wireless node from the spectrum access controller, a grant response indicating one or more channels the wireless node may transmit on, and restricted channel operational restrictions for the wireless node to transmit via one or more of the channels.

Example 11

The method of any of Examples 1-10, wherein: wherein the transmitting signals via the at least one restricted channel comprises transmitting a first set of signals to at least a first user device, while the wireless node is in a registered state with respect to the spectrum access controller; and wherein the transmitting signals via the at least one unrestricted channel comprises transmitting a second set of signals to at least a second user device, by the wireless node, via the at least one unrestricted channel within the shared frequency band, while the wireless node is in either the registered state or an unregistered state with respect to the spectrum access controller.

Example 12

The method of any of Examples 1-11, comprising: registering, by the wireless node, with the spectrum access controller, such that the wireless node is in a registered state with respect to the spectrum access controller; receiving, by the wireless node, information indicating restricted channel operational restrictions for the wireless node to transmit via the at least one restricted channel; receiving, by the wireless node, information indicating unrestricted channel operational restrictions for the wireless node to transmit via the at least one unrestricted channel; transmitting signals, by the wireless node while the wireless node is operating in a registered mode of operation, via the at least one restricted channel in accordance with the restricted channel operational restrictions; and transmitting signals, by the wireless node while the wireless node is operating in an unregistered mode of operation, via the at least one unrestricted channel in accordance with the unrestricted channel operational restrictions.

Example 13

An apparatus comprising means for performing the method of any of Examples 1-12.

Example 14

A non-transitory computer-readable storage medium comprising instructions stored thereon that, when executed by at least one processor, are configured to cause a computing system to perform the method of any of Examples 1-12.

Example 15

An apparatus comprising: at least one processor; and at least one memory including computer program code; the at least one memory and the computer program code configured to, with the at least one processor, cause the apparatus at least to perform the method of any of Examples 1-12.

Example 16

Figure 8:
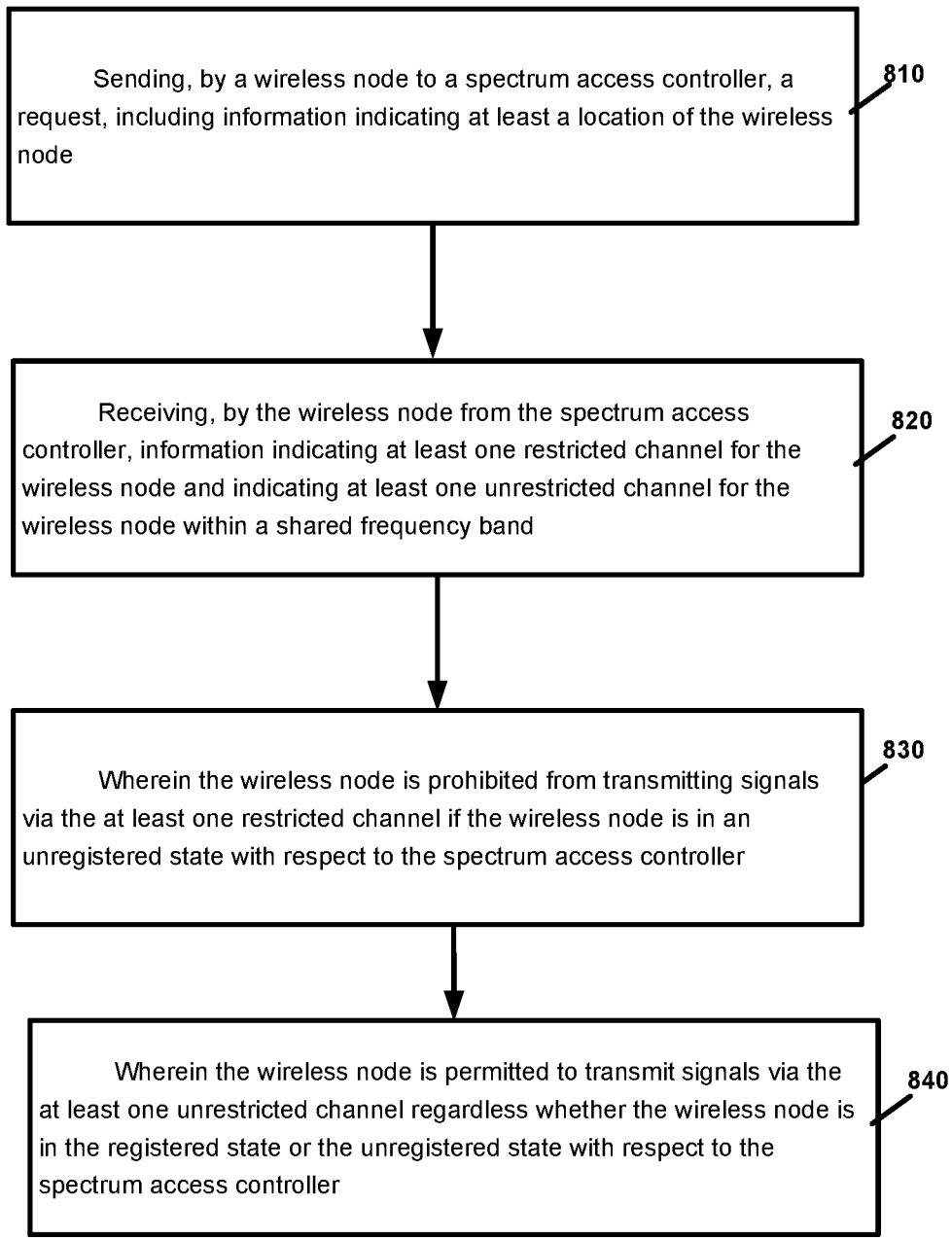
FIG. 8 is a flow chart illustrating operation of a non-incumbent user or wireless node according to an example embodiment.

FIG. 8 is a flow chart illustrating operation of a non-incumbent user or wireless node according to an example embodiment. Operation 810 includes sending, by a wireless node to a spectrum access controller, a request, including information indicating at least a location of the wireless node. Operation 820 includes receiving, by the wireless node from the spectrum access controller, information indicating at least one restricted channel for the wireless node and indicating at least one unrestricted channel for the wireless node within a shared frequency band. Operation 830 includes wherein the wireless node is prohibited from transmitting signals via the at least one restricted channel if the wireless node is in an unregistered state with respect to the spectrum access controller. Operation 840 includes wherein the wireless node is permitted to transmit signals via the at least one unrestricted channel regardless whether the wireless node is in the registered state or the unregistered state with respect to the spectrum access controller.

Example 17

The method of Example 16, comprising: determining, by the wireless node, a state of the wireless node as either a registered state with respect to the spectrum access controller or an unregistered state with respect to the spectrum access controller; transmitting, by the wireless node, signals via one or both of the at least one restricted channel and/or the unrestricted channel if the wireless node is in the registered state; and transmitting, by the wireless node, signals via the unrestricted channel if the wireless node is in the unregistered state.

Example 18

The method of any of Examples 16-17, wherein the wireless node is permitted to transmit signals via the at least one restricted channel if the wireless node is in a registered state with respect to the spectrum access controller.

Example 19

An apparatus comprising means for performing the method of any of Examples 16-18.

Example 20

A non-transitory computer-readable storage medium comprising instructions stored thereon that, when executed by at least one processor, are configured to cause a computing system to perform the method of any of Examples 16-18.

Example 21

An apparatus comprising: at least one processor; and at least one memory including computer program code; the at least one memory and the computer program code configured to, with the at least one processor, cause the apparatus at least to perform the method of any of Examples 16-18.

Example 22

Figure 9:
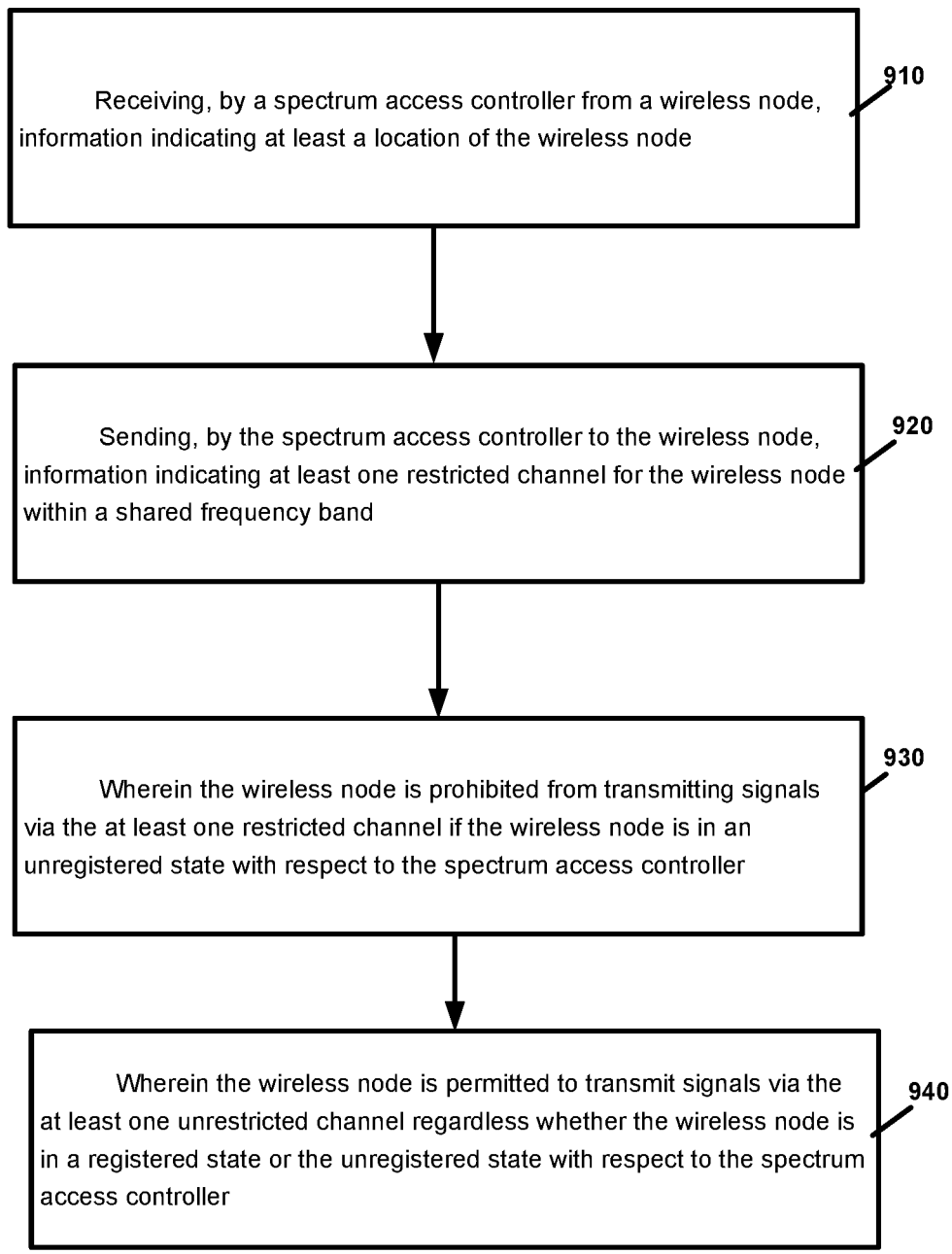
FIG. 9 is a flow chart illustrating operation of a spectrum access controller according to an example embodiment.

FIG. 9 is a flow chart illustrating operation of a spectrum access controller according to an example embodiment. Operation 910 includes receiving, by a spectrum access controller from a wireless node, information indicating at least a location of the wireless node. Operation 920 includes sending, by the spectrum access controller to the wireless node, information indicating at least one restricted channel for the wireless node within a shared frequency band. Operation 930 includes wherein the wireless node is prohibited from transmitting signals via the at least one restricted channel if the wireless node is in an unregistered state with respect to the spectrum access controller. Operation 940 includes wherein the wireless node is permitted to transmit signals via the at least one unrestricted channel regardless whether the wireless node is in a registered state or the unregistered state with respect to the spectrum access controller.

Example 23

The method of Example 22 wherein the sending comprises: sending, by the spectrum access controller to the wireless node, information indicating at least one restricted channel for the wireless node and indicating at least one unrestricted channel for the wireless node within the shared frequency band.

Example 24

The method of any of Examples 22-23, wherein the wireless node is permitted to transmit signals via the at least one restricted channel if the wireless node is in a registered state with respect to the spectrum access controller.

Example 25

The method of any of Examples 23-24: wherein the at least one restricted channel comprises at least one channel that has been assigned to, or is in use by, an incumbent user associated with a protection zone that encompasses the location of the wireless node, and within the protection zone no transmissions by an unregistered access point are permitted.

Example 26

The method of any of Examples 22-25: wherein the at least one unrestricted channel comprises a channel for which transmissions are permitted by a registered or an unregistered access point.

Example 27

The method of any of Examples 23-26, wherein the at least one restricted channel comprises at least one channel that has been assigned to or is in use by an incumbent user associated with a protection zone that encompasses the location of the wireless node.

Example 28

The method of any of Examples 22-27, further comprising: determining, by the spectrum access controller, information indicating a protection zone for at least one incumbent user of the shared frequency band; determining, by the spectrum access controller, that the protection zone for the at least one incumbent includes a geographical area that encompasses the location of the wireless node; determining, by the spectrum access controller, information indicating one or more channels assigned to, or in use by, an incumbent user within the protection zone for the at least one incumbent user; and determining, by the spectrum access controller, the at least one restricted channel for the wireless node.

Example 29

The method of any of Examples 22-28, further comprising: receiving, by the spectrum access controller from the wireless node, a registration request, including at least the location of the wireless node; and sending, by the spectrum access controller to the wireless node, a registration grant that grants the wireless node permission to transmit on the at least one restricted channel.

Example 30

An apparatus comprising means for performing the method of any of Examples 22-29.

Example 31

A non-transitory computer-readable storage medium comprising instructions stored thereon that, when executed by at least one processor, are configured to cause a computing system to perform the method of any of Examples 22-29.

Example 32

An apparatus comprising: at least one processor; and at least one memory including computer program code; the at least one memory and the computer program code configured to, with the at least one processor, cause the apparatus at least to perform the method of any of Examples 22-29.

Figure 10:
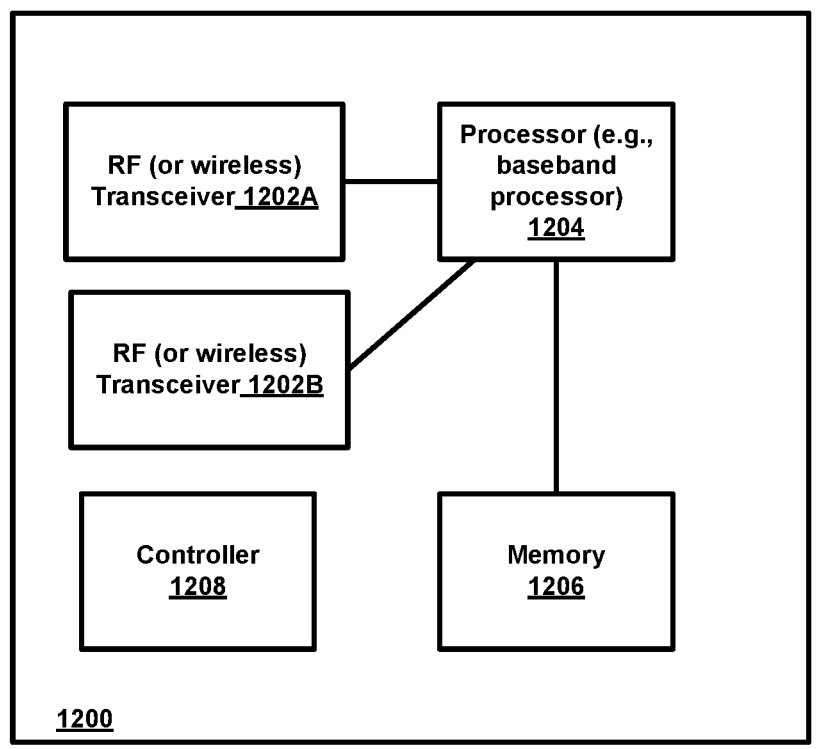
FIG. 10 is a block diagram of a wireless station or wireless node (e.g., AP, BS, RAN node, UE or user device, or other wireless node or network node) according to an example embodiment.

FIG. 10 is a block diagram of a wireless station (e.g., AP, BS or user device/UE, or another network node) 1200 according to an example embodiment. The wireless station 1200 may include, for example, one or more (e.g., two as shown in FIG. 10) RF (radio frequency) or wireless transceivers 1202A, 1202B, where each wireless transceiver includes a transmitter to transmit signals and a receiver to receive signals. The wireless station also includes a processor or control unit/entity (controller) 1204 to execute instructions or software and control transmission and receptions of signals, and a memory 1206 to store data and/or instructions.

Processor 1204 may also make decisions or determinations, generate frames, packets or messages for transmission, decode received frames or messages for further processing, and other tasks or functions described herein. Processor 1204, which may be a baseband processor, for example, may generate messages, packets, frames or other signals for transmission via wireless transceiver 1202 (1202A or 1202B). Processor 1204 may control transmission of signals or messages over a wireless network, and may control the reception of signals or messages, etc., via a wireless network (e.g., after being down-converted by wireless transceiver 1202, for example). Processor 1204 may be programmable and capable of executing software or other instructions stored in memory or on other computer media to perform the various tasks and functions described above, such as one or more of the tasks or methods described above. Processor 1204 may be (or may include), for example, hardware, programmable logic, a programmable processor that executes software or firmware, and/or any combination of these. Using other terminology, processor 1204 and transceiver 1202 together may be considered as a wireless transmitter/receiver system, for example.

In addition, referring to FIG. 10, a controller (or processor) 1208 may execute software and instructions, and may provide overall control for the station 1200, and may provide control for other systems not shown in FIG. 10, such as controlling input/output devices (e.g., display, keypad), and/or may execute software for one or more applications that may be provided on wireless station 1200, such as, for example, an email program, audio/video applications, a word processor, a Voice over IP application, or other application or software.

In addition, a storage medium may be provided that includes stored instructions, which when executed by a controller or processor may result in the processor 1204, or other controller or processor, performing one or more of the functions or tasks described above.

According to another example embodiment, RF or wireless transceiver(s) 1202A/1202B may receive signals or data and/or transmit or send signals or data. Processor 1204 (and possibly transceivers 1202A/1202B) may control the RF or wireless transceiver 1202A or 1202B to receive, send, broadcast or transmit signals or data.

The embodiments are not, however, restricted to the system that is given as an example, but a person skilled in the art may apply the solution to other communication systems. Another example of a suitable communications system is the 5G system. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (TOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
receiving, by a wireless node from a spectrum access controller for a shared frequency band, information indicating at least one restricted channel for the wireless node within the shared frequency band, wherein the wireless node is permitted to transmit signals via the at least one restricted channel only if the wireless node is in a registered state with respect to the spectrum access controller;
transmitting signals, by the wireless node, via the at least one restricted channel, while the wireless node is in a registered state with respect to the spectrum access controller; and
transmitting signals, by the wireless node, via the at least one unrestricted channel within the shared frequency band, while the wireless node is in either the registered state or an unregistered state with respect to the spectrum access controller, wherein the at least one unrestricted channel is at least one channel that is not part of the at least one restricted channel;
wherein the at least one restricted channel comprises at least one channel that has been assigned to, or is in use by, an incumbent user associated with a protection zone that encompasses the location of the wireless node and within the protection zone no transmissions by an unregistered access point are permitted; and
wherein the at least one unrestricted channel comprises a channel for which transmissions are permitted by a registered or an unregistered access point.

2. The method of claim 1 wherein the wireless node is prohibited from transmitting signals on the at least one restricted channel if the wireless node is in the unregistered state with respect to the spectrum access controller.

3. The method of claim 1, further comprising:
sending, by the wireless node to the spectrum access controller, a request, including information indicating at least a location of the wireless node;
wherein the receiving comprises:
receiving, by a wireless node from a spectrum access controller for a shared frequency band, a response including information indicating, based on at least the location of the wireless node, at least one restricted channel within the shared frequency band, wherein the wireless node is permitted to transmit signals via the at least one restricted channel only if the wireless node is in a registered state with respect to the spectrum access controller.

4. The method of claim 3, wherein:
the request is a spectrum inquiry request; and
the response is a spectrum inquiry response.

5. The method of claim 1, wherein the receiving comprises:
receiving, by the wireless node from the spectrum access controller, information indicating at least one restricted channel and indicating at least one unrestricted channel for or within the shared frequency band;
wherein the wireless node is permitted to transmit signals via the at least one restricted channel if the wireless node is in a registered state with respect to the spectrum access controller and is prohibited from transmitting signals via the at least one restricted channel if the wireless node is in an unregistered state with respect to the spectrum access controller; and
wherein the wireless node is permitted to transmit signals via the at least one unrestricted channel regardless whether the wireless node is in the registered state or the unregistered state with respect to the spectrum access controller.

6. The method of claim 5, wherein the receiving further comprises:
receiving, by the wireless node from the spectrum access controller, transmission restrictions, associated with the at least one unrestricted channel, that are required to be followed by the wireless node when transmitting signals, by the wireless node, via the at least one unrestricted channel within the shared frequency band.

7. The method of claim 1, wherein, for the at least one unrestricted channel, operational restrictions are provided for the at least one unrestricted channel if a protection zone applies for the at least one unrestricted channel, and wherein operational restrictions are not provided for the at least one unrestricted channel if a protection zone applies for the at least one unrestricted channel.

8. The method of claim 1, further comprising transitioning, by the wireless node, from the unregistered state with respect to the spectrum access controller to the registered state with respect to the spectrum access controller, including:
sending, by the wireless node to the spectrum access controller, a registration request, including at least a wireless node identifier to identify the wireless node, and the location of the wireless node; and
receiving, by the wireless node, a registration grant that indicates the wireless node has been registered with respect to the spectrum access controller.

9. The method of claim 8, further comprising:
sending, by the wireless node to the spectrum access controller, a grant request to request a grant or permission to transmit via the at least one restricted channel;
receiving, by the wireless node from the spectrum access controller, a grant response indicating one or more channels the wireless node may transmit on, and restricted channel operational restrictions for the wireless node to transmit via one or more of the channels.

10. The method of claim 1, wherein:
wherein the transmitting signals via the at least one restricted channel comprises transmitting a first set of signals to at least a first user device, while the wireless node is in a registered state with respect to the spectrum access controller; and
wherein the transmitting signals via the at least one unrestricted channel comprises transmitting a second set of signals to at least a second user device, by the wireless node, via the at least one unrestricted channel within the shared frequency band, while the wireless node is in either the registered state or an unregistered state with respect to the spectrum access controller.

11. The method of claim 1, comprising:
registering, by the wireless node, with the spectrum access controller, such that the wireless node is in a registered state with respect to the spectrum access controller;
receiving, by the wireless node, information indicating restricted channel operational restrictions for the wireless node to transmit via the at least one restricted channel;
receiving, by the wireless node, information indicating unrestricted channel operational restrictions for the wireless node to transmit via the at least one unrestricted channel;
transmitting signals, by the wireless node while the wireless node is operating in a registered mode of operation, via the at least one restricted channel in accordance with the restricted channel operational restrictions; and
transmitting signals, by the wireless node while the wireless node is operating in an unregistered mode of operation, via the at least one unrestricted channel in accordance with the unrestricted channel operational restrictions.

12. An apparatus comprising:
at least one processor; and
at least one memory including computer program code;
the at least one memory and the computer program code configured to, with the at least one processor, cause the apparatus at least to perform the method of claim 1.

13. A method comprising:
receiving, by a spectrum access controller from a wireless node, information indicating at least a location of the wireless node;
sending, by the spectrum access controller to the wireless node, information indicating at least one restricted channel for the wireless node within a shared frequency band;
wherein the wireless node is prohibited from transmitting signals via the at least one restricted channel if the wireless node is in an unregistered state with respect to the spectrum access controller;
wherein the wireless node is permitted to transmit signals via the at least one unrestricted channel regardless whether the wireless node is in a registered state or the unregistered state with respect to the spectrum access controller;
wherein the sending comprises sending, by the spectrum access controller to the wireless node, information indicating at least one restricted channel for the wireless node and indicating at least one unrestricted channel for the wireless node within the shared frequency band; and
wherein the at least one restricted channel comprises at least one channel that has been assigned to, or is in use by, an incumbent user associated with a protection zone that encompasses the location of the wireless node, and within the protection zone no transmissions by an unregistered access point are permitted.

14. The method claim 13, wherein the wireless node is permitted to transmit signals via the at least one restricted channel if the wireless node is in a registered state with respect to the spectrum access controller.

15. The method of claim 13:
wherein the at least one unrestricted channel comprises a channel for which transmissions are permitted by a registered or an unregistered access point.

16. The method of claim 13, wherein the at least one restricted channel comprises at least one channel that has been assigned to or is in use by an incumbent user associated with a protection zone that encompasses the location of the wireless node.

17. The method of claim 13, further comprising:
determining, by the spectrum access controller, information indicating a protection zone for at least one incumbent user of the shared frequency band;
determining, by the spectrum access controller, that the protection zone for the at least one incumbent includes a geographical area that encompasses the location of the wireless node;
determining, by the spectrum access controller, information indicating one or more channels assigned to, or in use by, an incumbent user within the protection zone for the at least one incumbent user;
determining, by the spectrum access controller, the at least one restricted channel for the wireless node.

18. The method of claim 13, further comprising:
receiving, by the spectrum access controller from the wireless node, a registration request, including at least the location of the wireless node; and
sending, by the spectrum access controller to the wireless node, a registration grant that grants the wireless node permission to transmit on the at least one restricted channel.

19. An apparatus comprising:
at least one processor; and
at least one memory including computer program code;
the at least one memory and the computer program code configured to, with the at least one processor, cause the apparatus at least to perform the method of claim 13.

20. A method comprising:
receiving, by a wireless node from a spectrum access controller for a shared frequency band, information indicating at least one restricted channel for the wireless node within the shared frequency band, wherein the wireless node is permitted to transmit signals via the at least one restricted channel only if the wireless node is in a registered state with respect to the spectrum access controller;
transmitting signals, by the wireless node, via the at least one restricted channel, while the wireless node is in a registered state with respect to the spectrum access controller; and
transmitting signals, by the wireless node, via the at least one unrestricted channel within the shared frequency band, while the wireless node is in either the registered state or an unregistered state with respect to the spectrum access controller, wherein the at least one unrestricted channel is at least one channel that is not part of the at least one restricted channel;
wherein the transmitting signals via the at least one restricted channel comprises transmitting a first set of signals to at least a first user device, while the wireless node is in a registered state with respect to the spectrum access controller; and
wherein the transmitting signals via the at least one unrestricted channel comprises transmitting a second set of signals to at least a second user device, by the wireless node, via the at least one unrestricted channel within the shared frequency band, while the wireless node is in either the registered state or an unregistered state with respect to the spectrum access controller.

21. An apparatus comprising:
at least one processor; and
at least one memory including computer program code;
the at least one memory and the computer program code configured to, with the at least one processor, cause the apparatus at least to perform the method of claim 20.

* * * * *